United States Patent
Saleem et al.

(10) Patent No.: US 8,423,607 B2
(45) Date of Patent: Apr. 16, 2013

(54) FALLBACK PROCEDURES FOR DOMAIN NAME SERVER UPDATE IN A MOBILE IP REGISTRATION

(75) Inventors: Athar Saleem, San Diego, CA (US); Mohammed H. Rashid, San Diego, CA (US); Sriram N. Nookala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 12/791,747

(22) Filed: Jun. 1, 2010

(65) Prior Publication Data

US 2011/0295940 A1    Dec. 1, 2011

(51) Int. Cl.
G06F 15/16    (2006.01)

(52) U.S. Cl.
USPC ............ 709/203; 709/217; 709/218; 709/219

(58) Field of Classification Search .................. 709/203, 709/217–219
See application file for complete search history.

(56) References Cited

U.S. PATENT DOCUMENTS

| | | | | |
|---|---|---|---|---|
| 5,706,284 | A * | 1/1998 | Lee ............................... | 370/324 |
| 7,596,802 | B2 * | 9/2009 | Border et al. ..................... | 726/1 |
| 2002/0199181 | A1 * | 12/2002 | Allen ............................... | 725/1 |
| 2003/0210770 | A1 * | 11/2003 | Krejcarek .................. | 379/88.17 |
| 2006/0176822 | A1 * | 8/2006 | Doyle et al. .................. | 370/241 |
| 2007/0053309 | A1 * | 3/2007 | Poojary et al. ................ | 370/256 |
| 2007/0097988 | A1 | 5/2007 | Baek | |
| 2007/0165542 | A1 | 7/2007 | Shin et al. | |
| 2007/0297430 | A1 * | 12/2007 | Nykanen et al. ............. | 370/408 |
| 2008/0034404 | A1 | 2/2008 | Pereira et al. | |
| 2008/0086564 | A1 * | 4/2008 | Putman et al. ................ | 709/227 |
| 2011/0153867 | A1 * | 6/2011 | van de Ven et al. ........... | 709/245 |
| 2012/0017259 | A1 * | 1/2012 | MacCarthaigh .................. | 726/1 |

FOREIGN PATENT DOCUMENTS

| | | |
|---|---|---|
| WO | WO2006062290 A1 | 6/2006 |
| WO | 2007038283 A2 | 4/2007 |
| WO | 2008109626 A1 | 9/2008 |

OTHER PUBLICATIONS

International Search Report and Written Opinion—PCT/US2011/038796, International Search Authority—European Patent Office—Sep. 20, 2011.
Jae-Hoon Jeong Jung-Soo Park Kyeong-Jin Lee Hyoung-Jun Kim Etri: The Auto configuration of Recursive DNS Server and the Optimization of DNS Name Resolution in Hierarchical Mobile IPv6; draft-jeong-hmipv6-dns-optimization-01.txt IETF Standard-Working-Draft, Internet Engineering Task Force, IETF, CH, No. 1, Jun. 18, 2003, XP015003800.

(Continued)

Primary Examiner — Mohamed Wasel
(74) Attorney, Agent, or Firm — Kevin T. Cheatham

(57) ABSTRACT

A method and/or apparatus for intelligent domain name server selection are provided. A mobile device may wirelessly receive one or more domain name server Internet Protocol (IP) addresses from a network serving agent during a call setup or a network registration. The mobile device then determines whether one or more of the received domain name server IP addresses is valid prior to attempting to contact a domain name server associated with one of the received domain name server IP addresses. A fallback sequence of valid domain name server IP addresses may be generated and provided (either individually or as a group) from a link layer to an application layer for domain name resolution. Received domain name server IP addresses that are geographically closer to a current location of the mobile device or its visited network may be given priority.

41 Claims, 6 Drawing Sheets

OTHER PUBLICATIONS

Jayshree Bharatia Kuntal Chowdhury Nortel Networks: Mobile IPv6 Extension: Using DNS Servers Assigned by Home Agent; draft-bharati a-mobi1ei p-v6-dns-ext-00.txt IETF Standard-Working-Draft, Internet Engineering Task Force, IETF, CH, Mar. 1, 2002, XP015000250.

Soliman Flarion C Castelluccia Inria K El Malki Ericsson L Bellier Inria H: Hierarchical Mobile IPv6 Mobility Management (HMIPv6); rfc4140.txt, IETF Standard, Internet Engineering Task Force, IETF, CH, Aug. 1, 2005, XP015041862.

* cited by examiner

FALLBACK PROCEDURES FOR DOMAIN NAME SERVER UPDATE IN A MOBILE IP REGISTRATION

FIELD

At least one feature relates to methods for domain name server updates for roaming mobile devices.

BACKGROUND

Internet Protocol (IP) technology is designed to enable packet-switched interconnection of a heterogeneous set of devices and communication networks. A potentially diverse set of network and link layer technologies are interconnected through nodes, e.g., gateways (or routers), that provide a packet forwarding service. Information is transferred between source and destination devices as blocks of data called datagrams, where the source and destination devices are identified by fixed length addresses. Routing in IP internetworks is connectionless in nature, in that datagrams are forwarded by routers on a hop-by-hop basis using the destination address in the datagram.

Mobile IP (or IP mobility) is an Internet Engineering Task Force (IETF) standard communications protocol that is designed to allow mobile devices to move from one network to another while maintaining a permanent IP address. The Mobile IP protocol allows location-independent routing of IP datagrams on the Internet. Each mobile device is identified by its home IP address regardless of its current location in the Internet. While roaming away from its home network, the mobile device is associated with a mobile IP address which identifies its current location. The mobile IP address for the mobile device may change or stay the same as the mobile device roams within the same or different networks. The Mobile IP protocol specifies how the mobile device registers with its home agent (in the home network) using its mobile IP address and how the home agent routes datagrams to the mobile device. A tunnel is established between the home agent for the home network and a foreign agent for the visited network. When a datagram addressed to the home IP address of the mobile device is received at the home network, the home agent forwards the datagram to the foreign agent in the visited network via the established tunnel.

The Domain Name System (DNS) is a hierarchical naming system for computers, services, or any resource connected to the Internet or a private network. DNS serves to translate domain names that are meaningful to humans into numerical (binary) identifiers associated with networking equipment for the purpose of locating and addressing these devices worldwide. The Domain Name System distributes the responsibility of assigning domain names and mapping those names to IP addresses by designating authoritative domain name servers, also known as dynamic DNS servers, for each domain. Domain name servers, also known as DNS servers, translate between a domain name (e.g., www.abc.com) and its corresponding IP address (e.g., 123.456.789.001). When setting up a call or session from a mobile or wireless device having a mobile IP (MIP) address, DNS server entries may be provided by a serving home and/or foreign agent which indicates which domain name server may be used by the mobile device for purposes of domain name resolution. For instance, when a MIP registration request is initiated by the mobile device, it may receive one or more DNS server entries from the foreign agent or by its home agent indicating which domain name servers may be used by the mobile device. The home agent may provide a DNS server in or proximate the home network while the foreign agent may provide a local DNS server (i.e., within the serving or visited network).

This DNS distribution scheme was developed primarily for wired networks but is finding applicability in wireless networks. However, unlike wired networks, wireless networks are more susceptible to corruption of data during over-the-air transmissions. Thus, a mobile device operating on a wireless network may receive incorrect, invalid, and/or corrupted DNS information. For time-sensitive applications (e.g., voice-over-IP, etc.), testing or contacting a DNS server to determine whether the received information is accurate, valid, or corrupt would tend to cause noticeable delays in providing service.

Consequently, a method is needed that facilitates DNS server updates in mobile devices operating on a wireless network while reducing or minimizing the potential delays of service.

SUMMARY

A method and/or apparatus are provided for intelligent domain name server selection. The apparatus may be a mobile device and the method may be operational in the mobile device. In one example, the mobile device may include a wireless communication interface and a processing unit. The wireless communication interface may serve to communicate over a wireless network and the processing circuit may be coupled to the wireless communication interface and adapted to perform one or more operations. Consequently, the mobile device may wirelessly receive one or more domain name server Internet Protocol (IP) addresses from a network serving agent during, for example, a call setup or a network registration. The one or more domain name server IP addresses may allow the mobile device to resolve domain names (e.g., obtain an IP address corresponding to the domain name) when requested (e.g., by an application executed in the mobile device). The network serving agent may include at least one of a network home agent for a home network and a network foreign agent for a visited network. The mobile device may obtain a mobile IP address from the network foreign agent upon roaming into the visited network.

The mobile device may then determine whether one or more of the received domain name server IP addresses is valid prior to attempting to contact a domain name server associated with one of the received domain name server IP addresses. According to one example, a domain name server IP address is considered valid if it is within a subnet address space associated with the mobile device. The domain name server IP address may be considered valid if it also is different from an IP address assigned to the mobile device. The determination of whether a received domain name server IP address is considered valid may occur, for example, as each domain name server IP address is received by the mobile device. The mobile device may then rank the one or more domain name server IP addresses in an order of preference as a fallback sequence of domain name server IP addresses.

Additionally, the mobile device may also determine which of the received domain name server IP addresses is geographically closest from a current location of the mobile device. The mobile device may then select the geographically closest domain name server IP address that is also valid as the selected domain name server IP address for domain name resolution.

In response to a domain name resolution request, the mobile device may use a selected domain name server IP address, from among one or more valid domain name server IP addresses, to fulfill the domain name resolution request.

For example, the selected domain name server IP address may be selected from the pre-generated fallback sequence of DNS server IP addresses. That is, the mobile device may be adapted to attempt domain name resolution by using the one or more domain name server IP addresses in the order of preference until successful domain name resolution is achieved.

In one example, using the selected domain name server IP address to fulfill the domain name resolution request may includes: (a) using a first domain name server IP address for domain name resolution if the first domain name server IP address is determined to be valid from among the one or more received domain name server IP addresses; and (b) using a previously obtained default domain name server IP address for domain name resolution if all of the received domain name server IP addresses are determined to be invalid.

To fulfill the domain name resolution request, the mobile device may send the domain name resolution request to the selected valid domain name server IP address. In response, the mobile device may receive an IP address corresponding to the domain name from the selected valid domain name server IP address.

In one example, the mobile device may implement a protocol stack including a link layer and an application layer. The call setup may include performing a link layer call setup between the mobile device and a foreign agent associated with a visited network for the mobile device. The network registration may include performing a link layer mobile IP registration between the mobile device and a home agent associated with a home network for the mobile device. The domain name resolution request is sent from the application layer and received by the link layer, where the link layer maintains a list of valid domain name server IP addresses. The determination of whether one or more of the received domain name server IP addresses is valid may be performed at the link layer.

DETAILED DESCRIPTION

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail so as not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Overview

According to one feature, a wireless mobile device having a mobile IP is adapted to intelligently select between a plurality of received domain name server IP addresses. When the mobile device roams into a visited network it may wirelessly receive one or more domain name server Internet Protocol (IP) addresses from a network serving agent during a call setup or a network registration. The mobile device may then determine whether one or more of the received domain name server IP addresses is valid prior to attempting to contact a domain name server associated with one of the received domain name server IP addresses. Thus, if a first domain name server IP address is determined to be valid (from among the one or more received domain name server IP addresses), then it may be used use for domain name resolution. Otherwise, if all of the received domain name server IP addresses are determined to be invalid, the mobile device may use a previously obtained default domain name server IP address for domain name resolution. Determining the validity of a domain name server IP address may be performed at a link layer while domain name resolution may be performed at an application layer. Additionally, the mobile device may give priority to domain name server IP addresses that are geographically closer to the current location of the mobile device or the visited network in which the mobile device is operating.

Exemplary Network Environment

Figure 1:
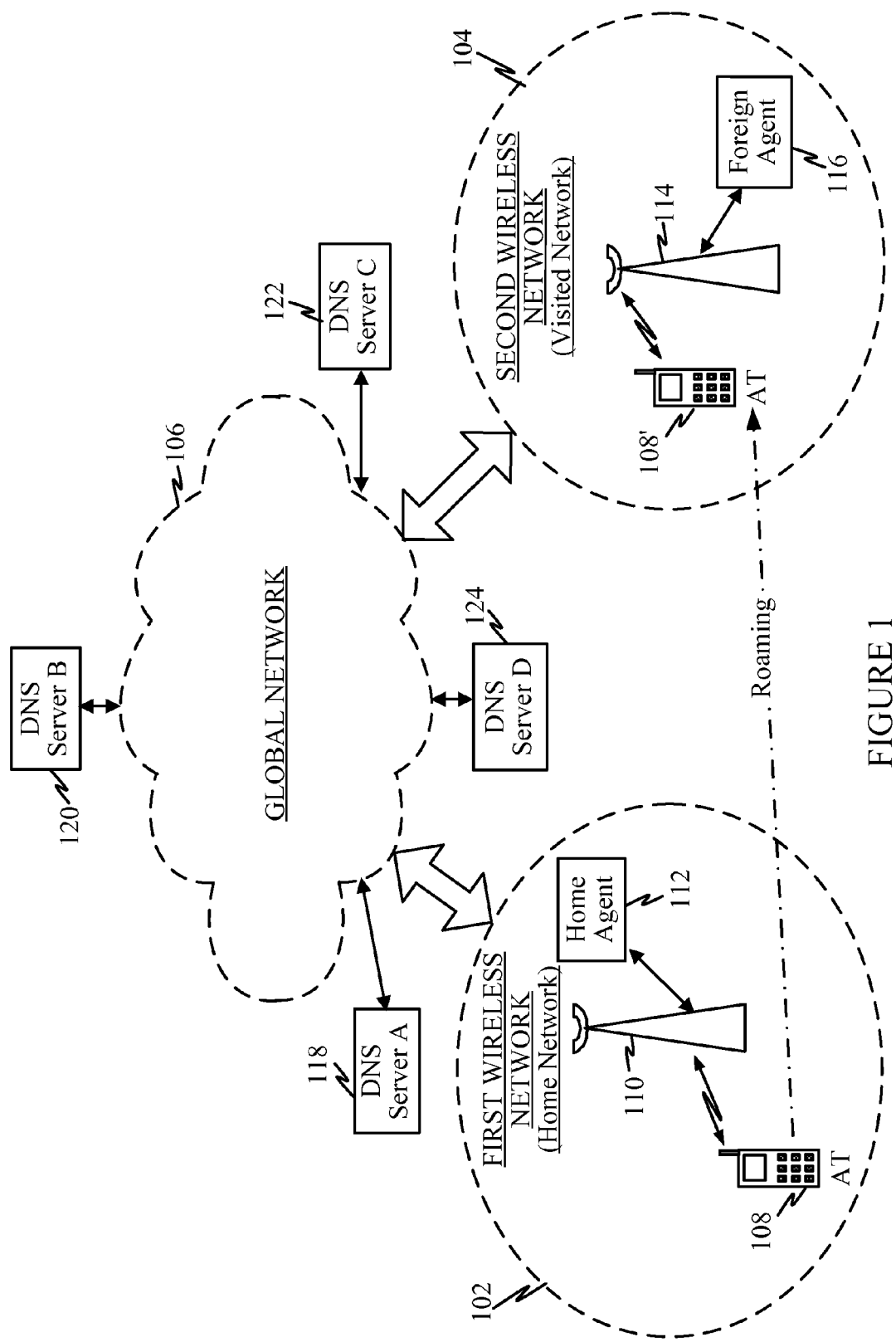
FIG. 1 illustrates an example of network environment in which a wireless mobile device may be adapted to perform intelligent domain name server selection.

FIG. 1 illustrates an example of network environment in which a wireless mobile device may be adapted to perform intelligent domain name server selection. The network environment may include a plurality of linked networks, such as a first network 102, a second network 104, and a global network 106. For example, the first network 102 may be a wireless network providing wireless connectivity to mobile devices or users via one or more wireless access points 110. The first network 102 may be the "home" network for a mobile device 108, where the home network is operated by a first service provider with which the first mobile device 108 subscribes to obtain communication (e.g., voice, data, etc.) services. The visited network 104 may be a second wireless network 104 providing wireless connectivity to mobile devices via one or more wireless access points 114. In this example, the second wireless network 104 may be operated by the first service provider or a different second service provider. As the mobile device 108' roams away from the first wireless network 102 and into the second wireless network 104, the second wireless network 104 may be considered a "visited" network. Even though the first mobile device 108' may not be a subscriber of the second service provider, the first mobile device 108' may still obtain communication services via the second wireless network 104 due to prior agreements between the first and second service providers. A home agent 112 in the first wireless network 102 serves to route or tunnel datagrams to the mobile device 108 when it is operating away from its home network. A foreign or serving agent 116 serves to store information about mobile devices visiting the second wireless network 104 and may also advertise mobile IP addresses (e.g., a care-of-addresses) for visiting mobile devices which are used by the Mobile IP protocol to locate roaming mobile devices. Thus, when the mobile device 108' roams into the second wireless network 104, the foreign agent 116 provides the mobile IP address to the home agent 112 which then establish a tunnel through which the home agent 112 and foreign agent can exchange datagrams to/from the mobile device 108'.

The global network 106 may include a plurality of interconnected networks, such as the Internet, may be communicatively coupled (or include) the first and second wireless networks 102 and 104. The global network 106 may be a packet switched network (such as the Internet). In order to allow the mobile device 108 to find other devices over the global network 106, a hierarchical addressing system may be implemented. In order to find another device within the network, the mobile device 108' may receive information (e.g., addresses) for one or more domain name servers 118, 120, 122, and/or 124 from the home agent 112 and/or the serving or foreign agent 116. That is, the home agent 112 and/or foreign agent 116 may provide the mobile device 108' with the name and/or address of one or more domain name servers 118, 120, 122, and/or 124 (i.e., DNS servers) that the mobile device 108' should use to resolve domain names into IP addresses for destination devices or nodes. In various examples, the home agent 112 may provide a DNS server A 118 that is geographically close or proximate the first wireless network 102 while the foreign agent 116 may provide a DNS server C 122 that is geographically close or proximate the second wireless network 104.

In some implementations, the mobile device 108' may have a pre-stored default DNS server IP address. Additionally, one or more DNS server IP addresses may be wirelessly received by the mobile device 108' from the home agent 112 and/or foreign agent 116. The DNS server IP addresses may be received, for example, during a MIP registration request or re-registration request (MIP RRQ/RRP) as part of one or more Normal Vendor Specific Extensions (NVSE) that may be received by the mobile device 108', for example, when it roams into a visited network (e.g., second wireless network 104). Since these DNS server IP addresses are wirelessly received, they may be corrupted during transmission. Additionally, even when these addresses are accurately received, the received DNS server IP addresses may be invalid due to, for example, misconfiguration of the serving network.

Another problem with the mobile device 108' having multiple DNS server addresses is that of some DNS servers identified by those addresses may be geographically very distant from the second wireless network 104 and/or the current location of the mobile device 108'. For instance, the home agent 112 may provide a DNS server address corresponding to a DNS server (e.g., DNS server A 118) that is geographically proximate to the first wireless network 102. Similarly, the foreign agent 116 may provide a DNS server address corresponding to a DNS server (e.g., DNS server C 122) that is geographically proximate to the second wireless network 104. If the mobile device 108' has roamed into the second wireless network 104, it is likely to obtain faster domain name resolution from a DNS server closest to the second wireless network 104 rather than from a DNS server closest to the first wireless network 102.

In time-sensitive applications, such as push-to-talk or voice-over-IP, when a caller attempts to initiate a call (e.g., voice/data/multimedia session) and hears an extended period of silence or non-activity, this may cause confusion and/or frustration and/or may be perceived as a failure to process the call. Accordingly, the caller may needlessly hang-up and restart the call.

Thus, avoiding unnecessary delays in contacting a DNS server and/or resolving a target domain name is desirable. This may be achieved by, for example, ranking available DNS servers according to their geographical proximity to the current serving network, thereby avoiding delays associated with the mobile device contacting or communicating with geographically distant DNS servers. According to another feature, the mobile device may also filter out invalid, erroneous, or incorrect DNS server prior to attempting to contact the DNS server, thereby avoiding unnecessary delays.

Exemplary Mobile Device

Figure 2:
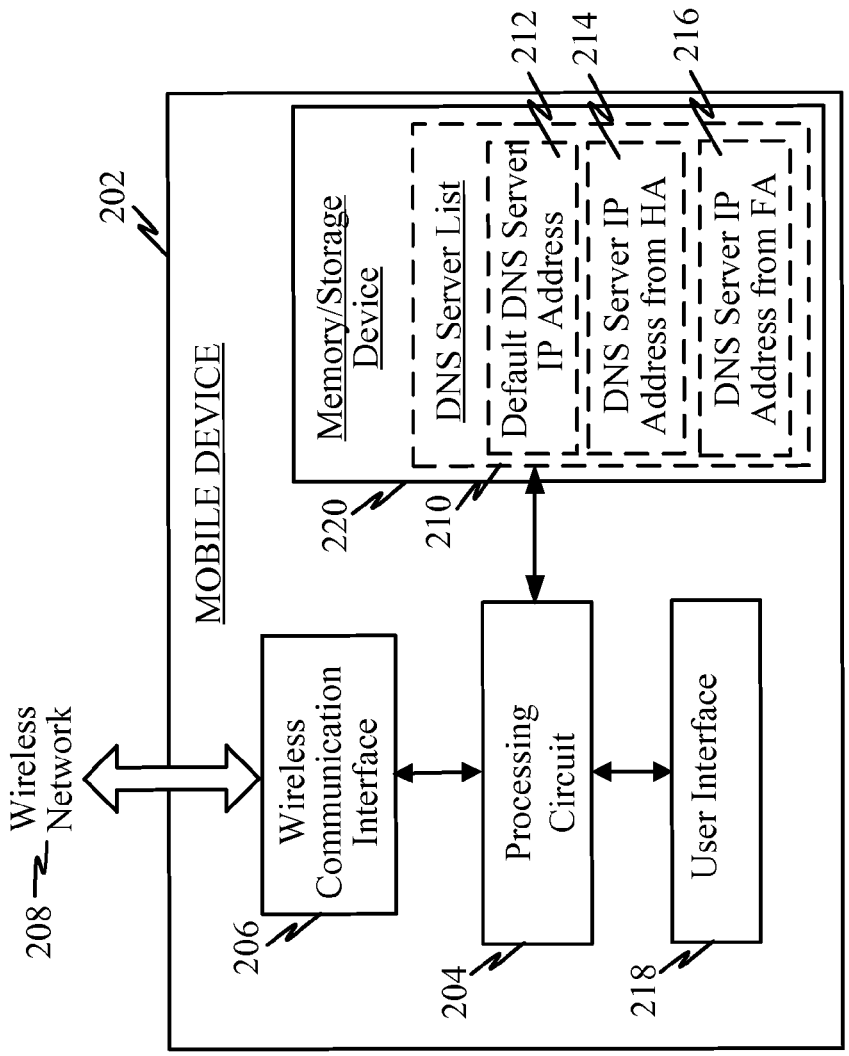
FIG. 2 is a block diagram illustrating an example of a mobile device that may implement intelligent domain name server selection.

FIG. 2 is a block diagram illustrating an example of a mobile device that may implement intelligent domain name server selection. The mobile device 202 may include a processing circuit, a wireless communication interface 206, a memory or storage device 220, and a user interface 218. In various implementations, the processing circuit 204 may comprise one or more processors or processing units that are adapted to perform or execute one or more operations or applications that facilitate voice, data, and/or multimedia communications to and/or from the mobile device 202. For example, the processing circuit 204 may be adapted to perform a mobile IP protocol that allows the mobile device 202 to roam and operate in other wireless networks (e.g., away from its home network). The wireless communication interface 206 may include a radio transmitter and/or receiver that allow the mobile device 202 to communicate over a wireless network 208. The memory or storage device may serve to store applications and/or data used by the processing circuit 204. The user interface 218 may include input interfaces, such as an audio microphone, a keypad, a touch screen, as well as output interfaces, such as an audio speaker and a display screen.

According to various implementations, the mobile device 202 may include a wireless or mobile phone, a cell phone, a laptop computer, a handheld user device such as a wireless tablet, a mobile communication device or computing, a wireless or mobile digital media player, among other wireless and/or mobile electronic devices capable of voice, data, and/or multimedia communications (i.e., transmission and/or reception). The mobile device 202 may also be interchangeably referred to as a node, terminal, apparatus and/or station.

In one example, when the mobile device 202 is roaming, the processing circuit 204 may be adapted to receive one or more DNS server addresses (e.g., sent by a home agent or foreign agent) and store them in the memory or storage device 220. For instance, the memory or storage device 220 may include a DNS Server List 210 that comprises one or more Default DNS Server IP addresses 212, one or more DNS Server IP addresses 214 provided by a Home Agent, and/or one or more DNS Server IP addresses 216 provided by a Foreign Agent. When seeking to obtain domain name resolution, the processing circuit 204 may be adapted to use one or more of the DNS server addresses 212, 214, and/or 216 in the memory or storage device 220 to identify and contact a domain name server via the wireless network 208.

Figure 3:
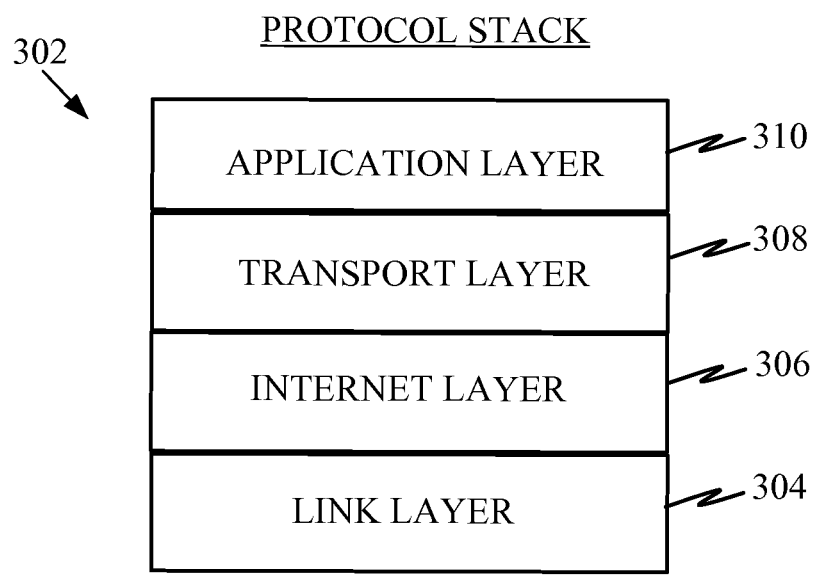
FIG. 3 illustrates one example of such hierarchical protocol stack that may be implemented in a mobile device.

According to one example, the mobile device 202 may be adapted or configured to perform wireless communications based on a hierarchical protocol stack. FIG. 3 illustrates one example of such hierarchical protocol stack 302, including a Link Layer 304, an Internet Layer 306, a Transport Layer 308, and an Application Layer 310. The Link Layer 304 may implement such protocols as, for example, Address Resolution Protocol (ARP), Reverse ARP (RARP), Open Shortest Path First (OSPF) for IPv4/IPv6, Intermediate System to Intermediate System (IS-IS), and Neighbor Discovery Protocol (NDP). The Internet Layer 306 may implement such protocols as, for example, Internet Protocol IPv4/IPv6, Internet Control Message Protocol (ICMP), and Internet Group Management Protocol (IGMP). The Transport Layer 308 may implement such protocols as, for example, Transmission Control Protocol (TCP), User Datagram Protocol (UDP), Datagram Congestion Control Protocol (DCCP), Stream Control Transmission Protocol (SCTP), Resource ReSerVation Protocol (RSVP), and Internet Link Protocol (IL). The Application Layer 308 may implement such protocols as, for example, Domain Name System (DNS), File Transfer Protocol (FTP), Hypertext Transfer Protocol (HTTP), Post Office Protocol (POP), and Simple Network Management Protocol (SNMP). Note that other protocol layers and/or protocols may be implemented (and are contemplated) as part of a protocol stack.

Note that the mobile device 202 may perform mobile IP registration/re-registration with the foreign agent and home agent at the Link Layer 304 but performs DNS resolution at the Application Layer 308.

Figure 4:
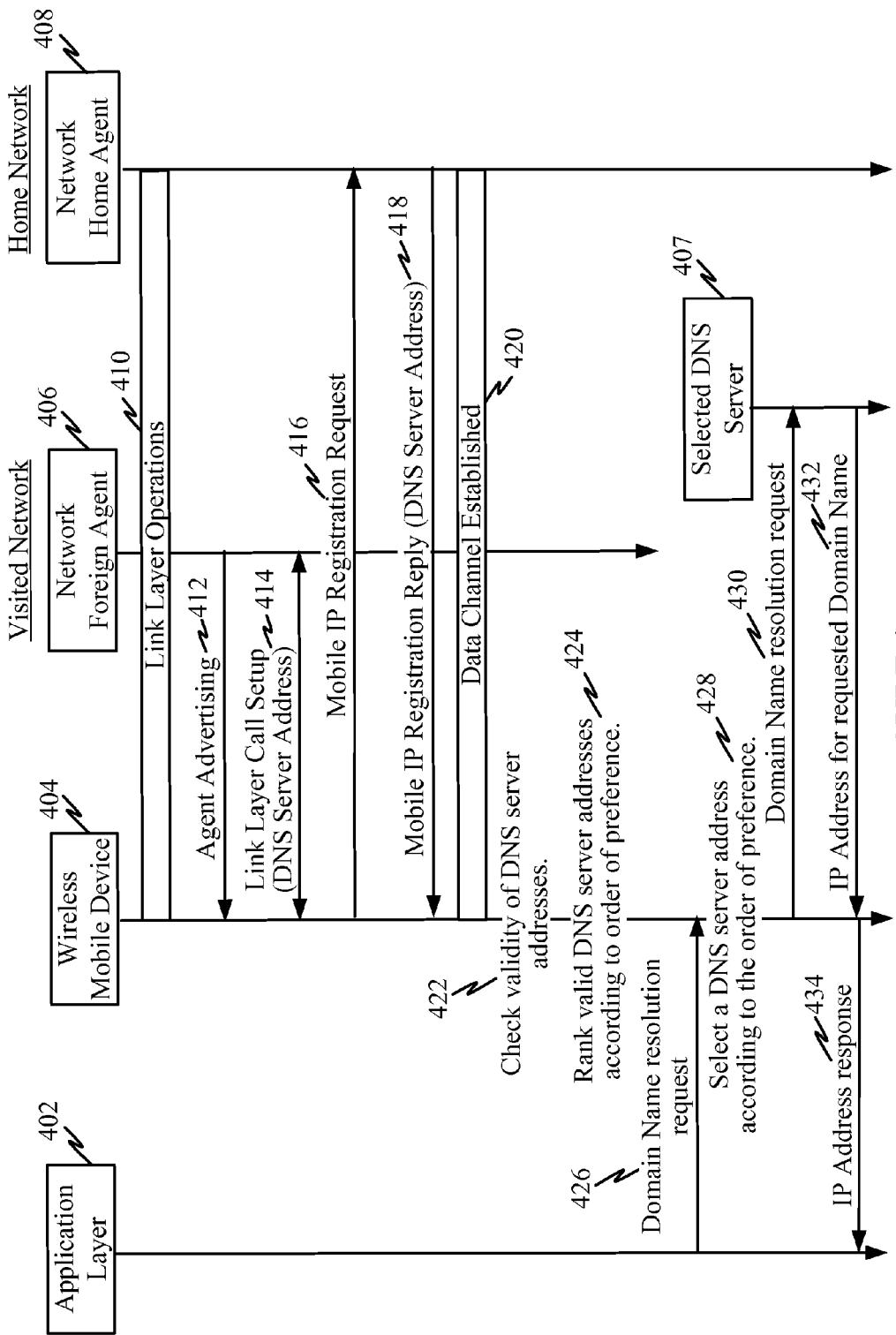
FIG. 4 is a diagram illustrating how a roaming mobile device may obtain one or more DNS server addresses while in a visited network.

FIG. 4 is a diagram illustrating how a roaming mobile device may obtain one or more DNS server addresses while in a visited network. When a wireless mobile device 404 roams into a visited network, it may first perform link layer operations 410, to for example, determine whether it has roamed away from its home network and establish communication services. Determining whether the mobile device has roamed may be accomplished by the mobile device listening for router or agent advertising 412 which may be periodic broadcasts from local agents (e.g., home agents, foreign agents, or mobility agents) for local wireless networks. Such agent advertising 412 would indicate to the mobile device whether it is still in its home network or whether it has roamed to a visited network. In some implementations, the agent advertising broadcast 412 may also provide the mobile IP address (e.g., a list of one or more care-of addresses) from which the mobile device 404 can select its mobile IP address for the visited network. The mobile device 404 may then perform a link layer call setup 414 by which it may contact a foreign agent 406 to establish a communication link with the visited network. For example, the mobile device 404 may reserve its mobile IP address with the foreign agent 406. As part of the call setup 414, the mobile device may receive one or more DNS server addresses from the foreign agent 406. The received one or more DNS server addresses may be used by the mobile device 404 to contact the DNS server(s) for domain name resolution.

The mobile device 404 may send a mobile IP registration request 416 which is routed to the foreign agent 406 and then to the home agent 408. Upon receiving the registration request 416, the home agent 408 may record the mobile IP address and associates it with the home (permanent) address for the mobile device 404. The home agent 408 may then establish a tunnel to the foreign agent 406 and forwards datagrams intended for the mobile device 404 to the foreign agent 406 which forwards them to the mobile device 404.

In response to the request 416, the mobile device 404 may receive a mobile IP registration reply 418 from the home agent 408. The reply 418 may also include one or more DNS server addresses from the home agent 408 and/or the foreign agent 406. Note that in some implementations the MIP registration reply 418 may include Normal Vendor Specific Extensions (NVSE) that contain one or more DNS server addresses.

Once a data channel 420 has been established for the mobile device 404, it may be capable of accessing a global network (e.g., Internet). The mobile device 404 may utilize one or more of the received DNS server addresses as its domain resolution server. However in order to avoid unnecessary delays, the mobile device 404 may first intelligently filter, rank, and/or select from among a plurality of DNS server addresses it may have received. For example, the mobile device 404 may check the validity of the DNS server addresses 422. DNS address validity may be checked at any of the layers (e.g., lower layers) of the protocol stack (e.g., Link Layer 304, Internet Layer 306, and/or Transport Layer 308 in protocol stack 302 of FIG. 3) in which the DNS address may be used and may also be stored in the same layer. From the identified valid DNS server addresses, the mobile device 404 may also rank these DNS server addresses 424 according to, for example, which is geographically closest to the mobile device (e.g., a DNS address that is within the subnet of for the mobile device 404 or visited network).

Upon receipt of a domain name resolution request 426 from an application in an Application Layer 402, the mobile device 104 (e.g., a Link Layer, Internet Layer, or Transport Layer in a protocol stack) selects a DNS server address according to the order of preference 428. The mobile device 404 then sends the domain name resolution request 430 to the selected DNS server 407. The selected DNS server 407 may then reply with an IP address for the requested domain name 432. The received IP address 432 may then be forwarded 434 to the application 402.

Intelligent Domain Name Server Selection

When a mobile device is executing time-sensitive applications (e.g., push-to-talk or voice-over-IP) over a wireless network, it cannot afford to try to use a DNS server IP address without knowing or having a high certainty that such DNS server IP address is valid and/or operational. Any noticeably delays in obtaining domain name resolution may be perceived as a network problem and hamper a user experience.

To reduce the chances of using invalid DNS server addresses and/or avoid delays associated with contacting a geographically distant DNS server, the mobile device may be adapted to intelligently filter, select, and/or rank wirelessly received DNS server addresses.

Figure 5:
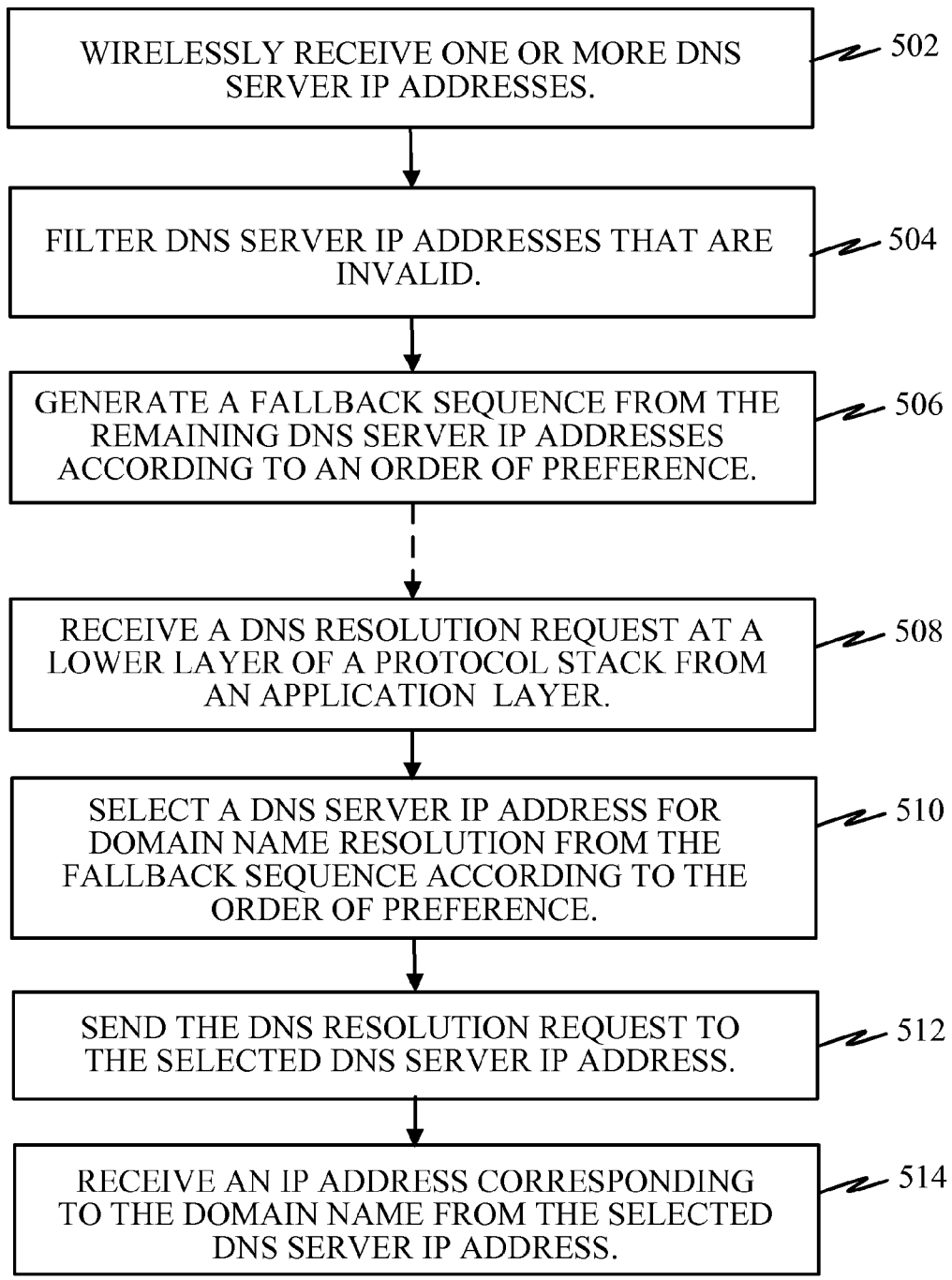
FIG. 5 illustrates a method operational in a mobile device for intelligently selecting a domain name server.

FIG. 5 illustrates a method operational in a mobile device for intelligently selecting a domain name server. The mobile device may wirelessly receive one or more DNS server IP addresses 502. For example, the one or more DNS server IP addresses may be received as part of a call setup on a visited network or a mobile IP registration or re-registration process while the mobile device is roaming in a visited network. The mobile device then filters, removes, or otherwise ignores DNS server IP addresses that are invalid 504. For example, as DNS server IP addresses are received (e.g., via a call setup response or a registration response) by the mobile device, each DNS server IP address may be compared to one or more IP address ranges, IP addresses, or IP address segments to determine whether it is "valid". If a received DNS server IP address falls within or outside one of the IP address ranges, IP addresses, and/or IP address segments, then it may be considered valid or invalid.

The mobile device may then generate a fallback sequence from the remaining DNS server IP addresses according to an order of preference 506. This fallback sequence may be generated, for example, at a link layer of a protocol stack for the mobile device. The order of preference may be based, for example, by selecting DNS servers which are geographically closest to the mobile device or the visited network in which it is operating (e.g., as ascertained by the subnet address space associated with the mobile device and/or visited network). For instance, DNS servers having IP addresses within the subnet address space of the mobile device or the visited network may be considered geographically closest to the mobile device. The fallback sequence may also include a default DNS server (e.g., pre-configured into the mobile device), previously verified DNS servers, previously negotiated DNS server IP addresses, and/or recently received DNS server addresses. In some implementations, the most recently received DNS server addresses (e.g., received in the most recent call setup and/or registration process) may be given priority over previously received DNS server addresses.

Subsequently, a DNS resolution request may be received at a lower layer of the protocol stack from the application layer 508. The lower layer may then select a DNS IP address for domain name resolution from the fallback sequence according to an order of preference 510. The DNS resolution request is then sent to the selected DNS server IP address 512. In response to the request, the mobile device may receive an IP address corresponding to the domain name from the selected DNS server IP address 514.

By filtering and/or checking the validity of a received DNS server IP address on the mobile device prior to attempting to use the DNS server IP address for domain name resolution, the mobile device may be able to continue operating in areas where the data channel conditions are not optimal while avoiding unnecessary attempts to re-establish the data channel and/or attempting to use every available DNS server. That is, applications that use a DNS server for domain name resolution (e.g., push-to-talk and voice-over-IP) are able to function in areas where over-the-air transmission loss or interference may cause data corruption or when the network is configured incorrectly (e.g., received DNS server IP addresses are invalid or corrupt). For such conditions, the mobile device can utilize the fallback sequence of DNS server IP addresses maintained at a lower level of a protocol stack (e.g., link layer, etc.).

Figure 6:
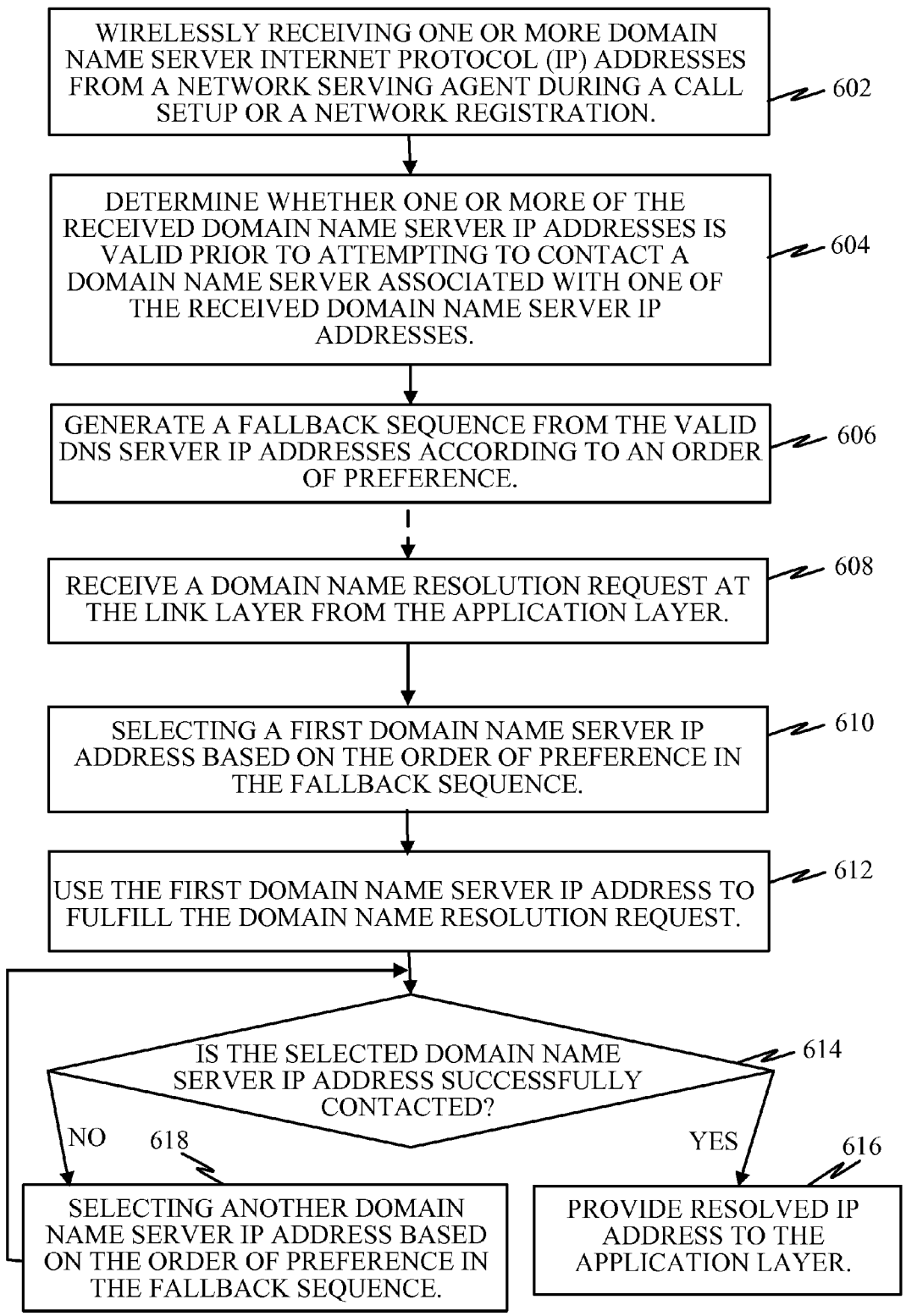
FIG. 6 illustrates another example of a method operational in a mobile device for intelligently selecting a domain name server.

FIG. 6 illustrates another example of a method operational in a mobile device for intelligently selecting a domain name server. The mobile device may be pre-provisioned with a default domain name server Internet Protocol (IP) addresses. However, one or more domain name server IP addresses may be wirelessly received at the mobile device from a network serving agent during a call setup or a network registration 602. The network serving agent may include at least one of a network home agent for a home network and a network foreign agent for a visited network. The mobile device may obtain a mobile IP address from the network foreign agent upon roaming into the visited network.

In some implementations, the mobile device may implement a protocol stack including a link layer and an application layer. The call setup may include performing a link layer call setup between the mobile device and a foreign agent associated with a visited network for the mobile device. The network registration may include performing a link layer mobile IP registration between the mobile device and a home agent associated with a home network for the mobile device.

To avoid delays associated with using an invalid domain name server, the mobile device determines whether one or more of the received domain name server IP addresses is valid prior to attempting to contact a domain name server associated with one of the received domain name server IP addresses 604. This determination may be made at a lower layer (e.g., link layer, internet layer, or transport layer) of the protocol stack. One or more of the valid domain name server IP addresses may be subsequently used for domain name resolution. If all of the received domain name server IP addresses are determined to be invalid, the mobile device may use a previously obtained default domain name server IP address for domain name resolution. The validity of a domain name server IP address may be based on one or more factors or tests. According to various examples, the first domain name server IP address is valid if:

(a) it is determined that the first domain name server IP address is within a subnet address space associated with the mobile device;

(b) it is not part of a blocked range of IP addresses; and/or (c) it is determined that the first domain name server IP address is different from an IP address assigned to the mobile device.

Thus, the mobile device may be pre-configured with, or receives, a subnet address space, a particular IP address, and/or an IP address segment against which a received domain name server IP address is compared to determine its validity. Determining whether one or more of the received domain name server IP addresses is valid may be performed:

(a) as each domain name server IP address is received by the mobile device, or (b) once a plurality of domain name server IP addresses have been received by the mobile.

According to an optional feature, the mobile device may be further adapted to determine which of the received domain name server IP addresses is geographically closest from a current location of the mobile device. The domain name server IP address that is both valid and geographically closest may be selected as the first domain name server IP address for domain name resolution.

Additionally, the mobile device may be adapted to rank the one or more valid domain name server IP addresses in an order of preference as a fallback sequence of domain name server IP addresses 606.

Subsequently, a domain name resolution request may be received at the link layer from the application layer 608. The link layer resolves the query request by selecting a first DNS server IP address based on the order of preference in the fallback sequence order 610. That is, the link layer may select the first DNS address in the fallback sequence. Then mobile device may be adapted to attempt domain name resolution by using the one or more domain name server IP addresses in the order of preference until successful domain name resolution is achieved. The link layer may then use the first DNS server IP address to fulfill the domain name resolution request 612.

If the selected (first) DNS server IP address is successfully contacted 614 (e.g., the DNS server is available), the link layer provides the resolved IP address to the application layer 616. That is, the DNS server (i.e., identified by the selected/first DNS server IP address) may receive the domain name, looks up the domain name, and/or returns a corresponding IP address to the requesting mobile device. This corresponding IP address may be returned to the application layer (e.g., in response to the request). Otherwise, if the selected (first) DNS IP address not successfully contacted 614 (e.g., the DNS server is unavailable), the link layer selects another domain name server IP address based on the order of preference in the fallback sequence, and uses it to fulfill the domain name resolution request 618.

The mobile device of FIG. 2 may be adapted to perform one or more of the steps illustrated in FIGS. 3, 4, 5 and/or 6. For example, the wireless communication interface 206 may serve to wirelessly receive one or more domain name server Internet Protocol (IP) addresses from a network serving agent during a call setup or a network registration. The processing circuit 204 may be adapted to:
  (a) determine whether one or more of the received domain name server IP addresses is valid prior to attempting to contact a domain name server associated with one of the received domain name server IP addresses; and
  (b) in response to a domain name resolution request, using a selected domain name server IP address, from among one or more valid domain name server IP addresses, to fulfill the domain name resolution request.

The processing circuit 204 may be further adapted to implement a protocol stack (e.g., in memory device 220) including a link layer and an application. The determination of whether the first domain name server IP address is valid may be performed at the link layer while domain name resolution may be performed at the application layer.

The various illustrative logical blocks, modules and circuits and algorithm steps described herein may be implemented or performed as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

When implemented in hardware, various examples may employ a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

When implemented in software, various examples may employ firmware, middleware or microcode. The program code or code segments to perform the necessary tasks may be stored in a machine-readable or computer-readable medium such as a storage medium or other storage(s). One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more examples herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Software may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

One or more of the components, steps, and/or functions illustrated in the Figures may be rearranged and/or combined into a single component, step, or function or embodied in several components, steps, or functions without the features described herein. Additional elements, components, steps, and/or functions may also be added without departing from the invention. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a mobile device intelligent domain name server selection, comprising:
    wirelessly receiving one or more domain name server Internet Protocol (IP) addresses from a network serving agent during a call setup or a network registration;
    determining whether one or more of the received domain name server IP addresses is valid prior to attempting to contact a domain name server associated with one of the received domain name server IP addresses; and
    in response to a domain name resolution request, using a selected domain name server IP address, from among one or more valid domain name server IP addresses, to fulfill the domain name resolution request.

2. The method of claim 1, wherein using the selected domain name server IP address to fulfill the domain name resolution request includes:
    using a first domain name server IP address for domain name resolution if the first domain name server IP address is determined to be valid from among the one or more received domain name server IP addresses; and
    using a previously obtained default domain name server IP address for domain name resolution if all of the received domain name server IP addresses are determined to be invalid.

3. The method of claim 1, wherein using the selected domain name server IP address to fulfill the domain name resolution request includes:
    sending the domain name resolution request to the selected valid domain name server IP address; and
    receiving an IP address corresponding to the domain name from the selected valid domain name server IP address.

4. The method of claim 1, further comprising:
    ranking the one or more domain name server IP addresses in an order of preference as a fallback sequence of domain name server IP addresses.

5. The method of claim 4, wherein the selected domain name server IP address is selected from the fallback sequence of domain name server IP addresses.

6. The method of claim 4, wherein the mobile device is adapted to attempt domain name resolution by using the one or more domain name server IP addresses in the order of preference until successful domain name resolution is achieved.

7. The method of claim 1, wherein the mobile device implements a protocol stack including a link layer and an application layer.

8. The method of claim 7, wherein the call setup includes
    performing a link layer call setup between the mobile device and a foreign agent associated with a visited network for the mobile device.

9. The method of claim 7, wherein the network registration includes
    performing a link layer mobile IP registration between the mobile device and a home agent associated with a home network for the mobile device.

10. The method of claim 7, wherein the domain name resolution request is sent from the application layer and received by the link layer, where the link layer maintains a list of valid domain name server IP addresses.

11. The method of claim 7, wherein determining whether one or more of the received domain name server IP addresses is valid is performed at the link layer.

12. The method of claim 1, wherein the network serving agent includes at least one of a network home agent for a home network or a network foreign agent for a visited network.

13. The method of claim 12, wherein the mobile device obtains a mobile IP address from the network foreign agent upon roaming into the visited network.

14. The method of claim 1, further comprising:
    determining which of the received domain name server IP addresses is geographically closest from a current location of the mobile device; and
    selecting the geographically closest domain name server IP address that is also valid as the selected domain name server IP address for domain name resolution.

15. The method of claim 1, wherein the selected domain name server IP address is valid if it is determined that the selected domain name server IP address is within a subnet address space associated with the mobile device.

16. The method of claim 1, wherein the selected domain name server IP address is valid if it is determined that the selected domain name server IP address is different from an IP address assigned to the mobile device.

17. The method of claim 1, wherein determining whether one or more of the received domain name server IP addresses is valid is performed as each domain name server IP address is received by the mobile device.

18. A mobile device, comprising:
    a wireless communication interface to communicate over a wireless network;
    a processing circuit coupled to the wireless communication interface, the processing circuit adapted to:
        wirelessly receive one or more domain name server Internet Protocol (IP) addresses from a network serving agent during a call setup or a network registration;
        determine whether one or more of the received domain name server IP addresses is valid prior to attempting to contact a domain name server associated with one of the received domain name server IP addresses; and
        in response to a domain name resolution request, use a selected domain name server IP address, from among one or more valid domain name server IP addresses, to fulfill the domain name resolution request.

19. The mobile device of claim 18, wherein using the selected domain name server IP address to fulfill the domain name resolution request, the processing circuit is further adapted to:
  use a first domain name server IP address for domain name resolution if the first domain name server IP address is determined to be valid from among the one or more received domain name server IP addresses; and
  use a previously obtained default domain name server IP address for domain name resolution if all of the received domain name server IP addresses are determined to be invalid.

20. The mobile device of claim 18, wherein using the selected domain name server IP address to fulfill the domain name resolution request, the processing circuit is further adapted to:
  send the domain name resolution request to the selected valid domain name server IP address; and
  receive an IP address corresponding to the domain name from the selected valid domain name server IP address.

21. The mobile device of claim 18, wherein the processing circuit is further adapted to:
  rank the one or more domain name server IP addresses in an order of preference as a fallback sequence of domain name server IP addresses.

22. The mobile device of claim 21, wherein the selected domain name server IP address is selected from the fallback sequence of domain name server IP addresses.

23. The mobile device of claim 18, wherein the processing circuit is further adapted to:
  implement a protocol stack including a link layer and an application layer, where determining whether one or more of the received domain name server IP addresses is valid is performed at the link layer and using the selected domain name server IP address to fulfill the domain name resolution request is performed at the application layer.

24. The mobile device of claim 18, wherein:
  the call setup includes performing a link layer call setup between the mobile device and a foreign agent associated with a visited network for the mobile device, and
  the network registration includes performing a link layer mobile IP registration between the mobile device and a home agent associated with a home network for the mobile device.

25. The mobile device of claim 18, wherein the network serving agent includes at least one of a network home agent for a home network or a network foreign agent for a visited network.

26. The mobile device of claim 18, wherein the processing circuit is further adapted to:
  provide the valid domain name server IP addresses from the link layer to the application layer in a fallback sequence order of preference.

27. The mobile device of claim 18, wherein using the selected domain name server IP address to fulfill the domain name resolution request, the processing circuit is further adapted to:
  determine which of the received domain name server IP addresses is geographically closest from a current location of the mobile device; and
  select the geographically closest domain name server IP address that is also valid as the selected domain name server IP address for domain name resolution.

28. The mobile device of claim 18, wherein the selected domain name server IP address is valid if it is determined that the selected domain name server IP address is different from an IP address assigned to the mobile device.

29. A mobile device, comprising:
  means for wirelessly receiving one or more domain name server Internet Protocol (IP) addresses from a network serving agent during a call setup or a network registration;
  means for determining whether one or more of the received domain name server IP addresses is valid prior to attempting to contact a domain name server associated with one of the received domain name server IP addresses; and
  means for using a selected domain name server IP address, from among one or more valid domain name server IP addresses, to fulfill a domain name resolution request.

30. The mobile device of claim 29, further comprising:
  means for implementing a protocol stack including a link layer and an application layer, where determining whether one or more of the domain name server IP addresses is valid is performed at the link layer and using the selected domain name server IP address to fulfill the domain name resolution request is performed at the application layer.

31. The mobile device of claim 30, further comprising:
  means for providing the valid domain name server IP addresses from the link layer to the application layer in a fallback sequence order of preference.

32. The mobile device of claim 29, further comprising:
  means for ranking the one or more domain name server IP addresses in an order of preference as a fallback sequence of domain name server IP addresses.

33. The mobile device of claim 29, wherein the network serving agent includes at least one of a network home agent for a home network or a network foreign agent for a visited network.

34. The mobile device of claim 29, wherein the means for using the selected domain name server IP address to fulfill the domain name resolution request comprises:
  means for determining which of the received domain name server IP addresses is geographically closest from a current location of the mobile device; and
  means for selecting the geographically closest domain name server IP address that is also valid as the selected domain name server IP address for domain name resolution.

35. The mobile device of claim 29, wherein the selected domain name server IP address is valid if the means for determining determines that the selected domain name server IP address is different from an IP address assigned to the mobile device.

36. A non-transitory machine-readable storage medium comprising instructions operational in a mobile device for intelligent domain name server selection, which when executed by one or more processors causes the processors to:
  wirelessly receive one or more domain name server Internet Protocol (IP) addresses from a network serving agent during a call setup or a network registration;
  determine whether one or more of the received domain name server IP addresses is valid prior to attempting to contact a domain name server associated with one of the received domain name server IP addresses; and
  use a selected domain name server IP address, from among one or more valid domain name server IP addresses, to fulfill a domain name resolution request.

37. The non-transitory machine-readable storage medium of claim 36, wherein the instructions when executed by the one or more processors further causes the processors to:
  rank the one or more domain name server IP addresses in an order of preference as a fallback sequence of domain name server IP addresses.

38. The non-transitory machine-readable storage medium of claim 36, wherein the mobile device implements a protocol stack including a link layer and an application layer.

39. The non-transitory machine-readable storage medium of claim 36, wherein the network serving agent includes at least one of a network home agent for a home network or a network foreign agent for a visited network.

40. The non-transitory machine-readable storage medium of claim 36, wherein the instructions that cause the processors to use the selected domain name server IP address to fulfill the domain name resolution request further cause the processors to:
  determine which of the received domain name server IP addresses is geographically closest from a current location of the mobile device; and
  select the geographically closest domain name server IP address that is also valid as the selected domain name server IP address for domain name resolution.

41. The non-transitory machine-readable storage medium of claim 36, wherein the selected domain name server IP address is valid if the instructions cause the processors to determine that the selected domain name server IP address is different from an IP address assigned to the mobile device.

* * * * *